March 26, 1957  G. D. BARRY  2,786,429
ICE CREAM SCOOP
Filed May 2, 1956
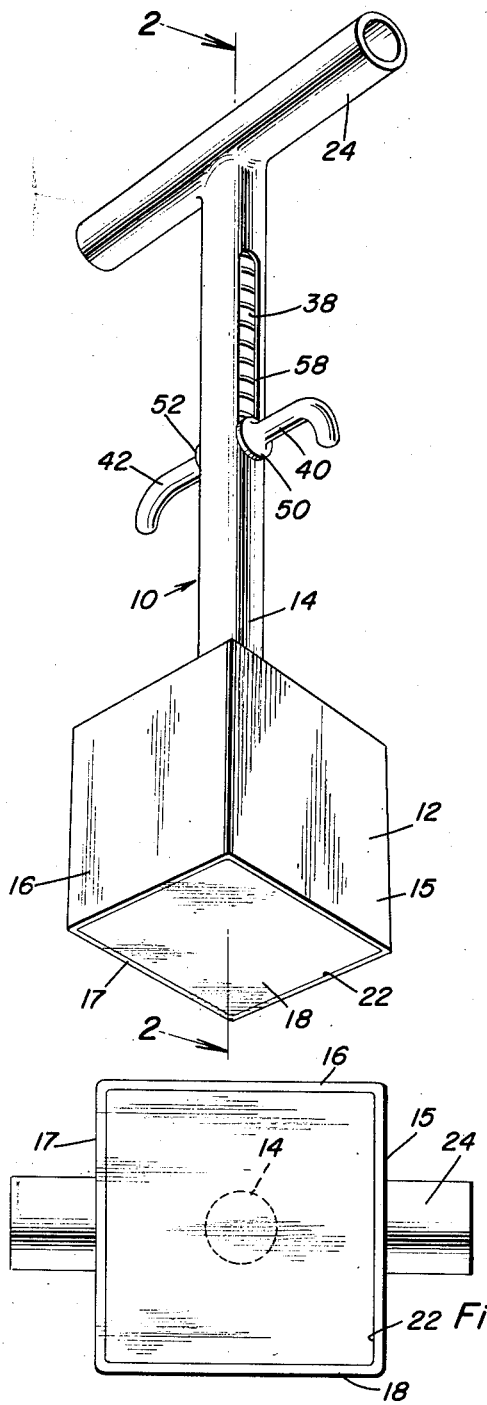
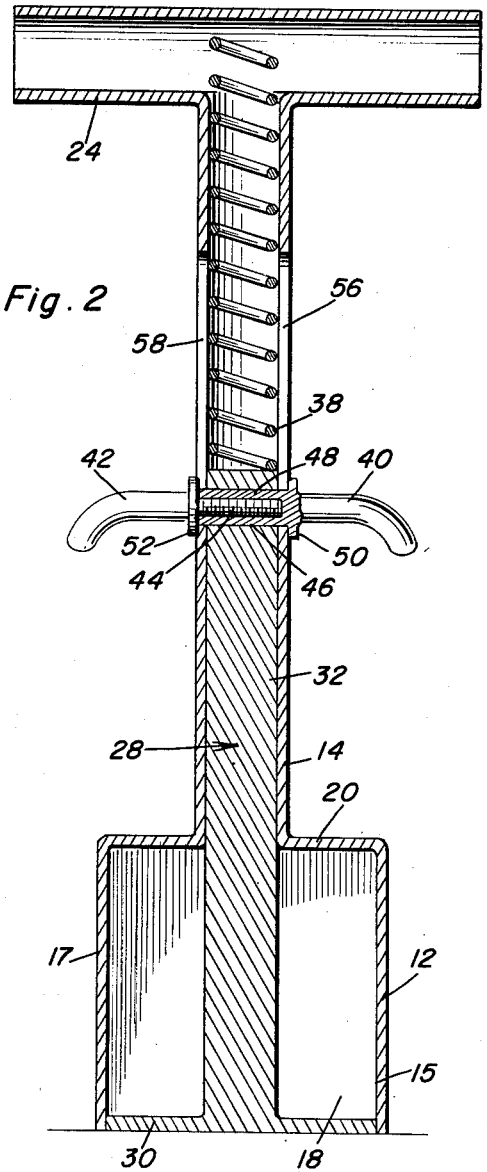
George D. Barry
INVENTOR.

United States Patent Office 2,786,429
Patented Mar. 26, 1957

2,786,429
ICE CREAM SCOOP

George D. Barry, Healdsburg, Calif., assignor of one-half to Glenn S. Mitchell, Annapolis, Calif.

Application May 2, 1956, Serial No. 582,097

1 Claim. (Cl. 107—48)

This invention relates to improvement in ice cream scoops and particularly to an ice cream scoop which is constructed in a novel manner.

An object of the present invention is to provide an ice cream scoop of very simple construction, the scoop being automatically operative to eject the ice cream from the mold after it has been thrust into the ice cream in order to fill the mold. The automatic operation takes place by releasing a finger-grip bar thereby permitting the stored energy in a spring to be applied against the ice cream ejector in order to discharge the ice cream from the mold. The square shape of the scoop facilitates its operation in removing ice cream from square containers.

A further object of the invention is to provide a mechanically simple device of this nature which will make it possible to completely avoid latches, locks and the like in constructing an ice cream scoop and yet, will provide means to form approximately square ice cream portions very quickly and deposit them on a dish or other receiver.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of the ice cream scoop that is made in accordance with the principles of the invention;

Figure 2 is a longitudinal sectional view taken approximately on the line 2—2 of Figure 1; and, Figure 3 is a bottom plan view of the scoop in Figure 1.

In the accompanying drawing the ice cream scoop 10 which exemplifies the principles of the invention is preferably made of a non-contaminating, non-corroding material, as stainless steel, chrome plated sheet metal or even some forms of commercially available plastic materials. In either case, it is formed with a mold 12 together with a handle 14, the latter being preferably tubular and hollow. Mold 12 is approximately square in cross-section (Fig. 3) and has four walls 15, 16, 17 and 18, respectively. The four walls are joined by an end wall 20 at their inner edges and have an entrance 22 at their open end. The handle 14 is joined to the wall 12 and has its bore in registry with an opening in that wall. The outer extremity of handle 14 is formed with a palm-receiving transverse member 24 for the convenience of the operator in using the scoop 10.

An ejector 28 is mounted in the hollow handle 14 and in the mold 12. Ejector 28 consists of an ejector plate 30 in mold 12 together with a rod 32 which is fixed perpendicularly to ejector plate 30 and which passes into the bore of hollow handle 14. Means constantly, yieldingly biasing the ejector outwardly of the mold 12 are operatively connected to the rod 32. The preferable means consist of a coil spring 38 that is located in the hollow handle 14, resting at one end on rod 32 and at the other end on the palm-receiving transverse member 24.

Means to receive the fingers of the operator and constitute a finger-grip are attached to the rod 32. They comprise a pair of rods 40 and 42, respectively. The ends of the rods are curved downwardly so as to assure that the fingers will not slip therefrom in the operation of the invention. The inner ends of the bars have means connecting them together. One bar is formed with a screw 44 while the other bar has an internally threaded socket 46. The screw is threaded in the socket 46, and both are fitted into a transverse bore 48 in rod 32. When the screw is tightened in threaded bore 48, the collars 50 and 52, respectively, on bars 40 and 42 lightly rest on the outer surface of the hollow handle 14. Slots 56 and 58, respectively, are formed longitudinally in the hollow handle 14 and have bars 40 and 42 extended therethrough. The slot determines the extent of travel of the ejector 24 inasmuch as the transverse bars 40 and 42 come to bear against the ends thereof in the limit of travel in both directions of ejector 28.

In use of the scoop, it is thrust into the ice cream after the operator has pulled the bars 40 and 42 with his fingers toward the transverse cross member 24. This compresses the spring 38 storing potential energy therein. Then, after thrusting the open end of the mold 12 into the ice cream, the scoop is removed and placed over a dish, ice cream cone or other receiver for the ice cream portion. The operation of the scoop merely releases the bars 40 and 42 from the grasp of his fingers allowing the stored potential energy in the spring 38 to forcibly eject the ejector 28 so that plate 30 pushes the ice cream from mold 12.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

An ice cream scoop comprising a mold that is generally square in cross section and that has four side walls and a top wall, the bottom of said mold being open in order to form an ice cream entrance, a hollow handle fixed to said top wall and having a passage which is in registry with the interior of said mold, a transverse palm receiving hollow bar fixed to said hollow handle at the outer end thereof, said hollow bar having a bore which registers with the passage in said hollow handle, said hollow handle having intermediate its ends a pair of parallel slots, an ejector plate located in said mold, an ejector rod secured to said ejector plate and slidably disposed in the passage of said hollow handle, a pair of finger grip bars, means detachably securing said bars together at the confronting ends thereof, said ejector rod having a hole near the outer end thereof in which said finger grip bars are received, thereby coupling said bars to said ejector rod, collars on each of said finger grip bars and contacting the outer surface of said hollow handle over said slots, said finger grip bars being passed through said slots whereby the ends of said slots define the limit of travel of said ejector bar and ejector plate, a spring reacting on a wall of said palm receiving bar and on said ejector rod constantly biasing said ejector rod and said ejector plate outwardly of said mold, and the outer ends of said finger grip bars being curved toward said mold in order to prevent the fingers of the user from slipping over said ends of said finger grip bars.

References Cited in the file of this patent
UNITED STATES PATENTS

| | | |
|---|---|---|
| 484,023 | Kaiser | Oct. 11, 1892 |
| 1,488,138 | Warner | Mar. 25, 1924 |
| 1,531,179 | Daly | Mar. 24, 1925 |